United States Patent
Ingraham

[11] Patent Number: 5,137,338
[45] Date of Patent: Aug. 11, 1992

[54] COMBINATION VEHICULAR BRAKING AND ACCESSORY CONTROL SYSTEM

[75] Inventor: Ronald D. Ingraham, Reed City, Mich.

[73] Assignee: Nartron Corporation, Reed City, Mich.

[21] Appl. No.: 652,973

[22] Filed: Feb. 11, 1991

[51] Int. Cl.⁵ .............................................. B60T 13/74
[52] U.S. Cl. .................................... 303/3; 303/15; 188/158; 280/703; 180/175; 338/108; 200/61.89
[58] Field of Search .......... 303/3, 15, 20, 50, 113 SS; 188/158; 280/703; 180/175, 178; 338/99, 108, 153; 200/61.89

[56] References Cited

U.S. PATENT DOCUMENTS

| | | | |
|---|---|---|---|
| 2,091,086 | 7/1937 | Taylor | 177/337 |
| 2,232,447 | 2/1941 | Griffith | 200/59 |
| 2,276,028 | 3/1942 | Dick | 200/59 |
| 2,445,660 | 7/1948 | Bruestle | 201/50 |
| 2,454,291 | 11/1948 | Penrose | 201/51 |
| 2,530,131 | 11/1950 | Roters | 318/261 |
| 2,674,669 | 4/1954 | Leedam | 200/86.5 |
| 2,832,863 | 4/1958 | Quimby | 200/61.89 |
| 3,125,739 | 3/1964 | Deibel et al. | 338/99 |
| 3,171,917 | 3/1965 | Leichsenring | 200/86.5 |
| 3,219,775 | 11/1965 | Carpenter | 200/61.89 |
| 3,390,243 | 6/1968 | Obermann | 200/166 |
| 3,398,992 | 8/1968 | Littmann | 303/20 |
| 3,419,115 | 12/1968 | Glenn | 192/2 |
| 3,439,323 | 4/1969 | Kersting | 340/52 |
| 3,574,414 | 4/1971 | Jacob | 303/7 |
| 3,581,028 | 5/1971 | Valbona | 200/38 |
| 3,622,723 | 11/1971 | Fischel | 200/86 R |
| 3,711,162 | 1/1973 | Steinbrenner et al. | 303/21 R |
| 3,766,342 | 10/1973 | Stadelmann | 200/61.89 |
| 3,790,225 | 2/1974 | Wehde | 303/113 SS |
| 3,802,745 | 4/1974 | Strifler et al. | 303/3 |
| 3,814,484 | 6/1974 | Matthews et al. | 303/20 |
| 3,823,985 | 7/1974 | Hubbard | 303/7 |
| 3,827,758 | 8/1974 | Hansen | 303/3 |
| 3,838,888 | 10/1974 | Gynn | 303/20 |
| 3,840,276 | 10/1974 | Jubenville | 303/20 |
| 3,882,442 | 5/1975 | Hubbard | 338/42 |
| 3,911,394 | 10/1975 | Shames | 340/71 |
| 3,981,542 | 9/1976 | Abrams et al. | 303/20 |
| 4,005,759 | 2/1977 | Farr | 180/65 R |
| 4,145,317 | 3/1979 | Sado et al. | 252/512 |
| 4,152,304 | 5/1979 | Tadewald et al. | 252/506 |
| 4,163,204 | 7/1979 | Sado et al. | 338/114 |
| 4,297,550 | 10/1981 | Leighton | 200/61.89 |
| 4,404,439 | 9/1983 | Leighton | 200/61.89 |
| 4,419,653 | 12/1983 | Walgand | 338/114 |
| 4,441,097 | 4/1984 | Anderson | 340/365 A |
| 4,602,702 | 7/1986 | Ohta et al. | 188/72.1 |
| 4,639,710 | 1/1987 | McMillan et al. | 338/108 |
| 4,658,939 | 4/1987 | Kircher et al. | 188/156 |
| 4,686,626 | 8/1987 | Kuroki et al. | 280/203 |
| 4,691,284 | 9/1987 | Izumi et al. | 280/703 |
| 4,784,442 | 11/1988 | Petersen | 303/3 |
| 4,818,036 | 4/1989 | Reinecke | 303/50 |
| 4,978,177 | 12/1990 | Ingraham et al. | 303/3 |
| 5,010,972 | 4/1991 | Ingraham et al. | 180/178 |

Primary Examiner—Joseph F. Peters, Jr.
Assistant Examiner—Christopher P. Ellis
Attorney, Agent, or Firm—Lon H. Romanski

[57] ABSTRACT

An automotive vehicle having accessories as for example an anti-dive suspension and anti-dive suspension control, has an electrical circuit which is effective for applying control type signals to such accessories reflective of the rate of change in magnitude of the force applied to the vehicular braking system by the driver; a force sensitive resistor placed in the vehicular braking system is effective to create output signals to the electrical circuit which signals are employed by the electrical circuit to produce corresponding control type signals for application to the accessories.

15 Claims, 9 Drawing Sheets

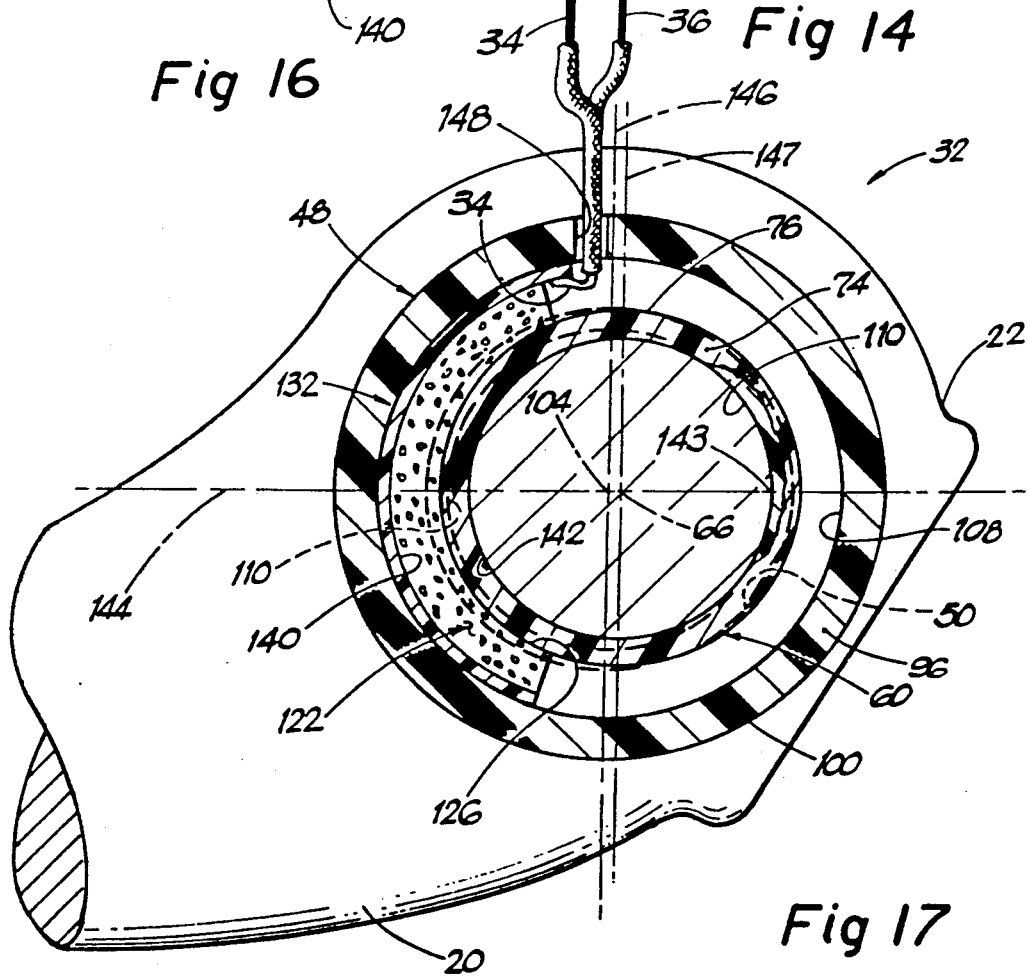

COMBINATION VEHICULAR BRAKING AND ACCESSORY CONTROL SYSTEM

FIELD OF THE INVENTION

This invention relates generally to electrical circuit means and more particularly to such circuit means responsive to the rate of change of the magnitude of applied forces for in turn providing outputs employable in initiating, terminating, modifying or regulating related events.

BACKGROUND OF THE INVENTION

Heretofore automotive vehicles have been provided with anti-dive systems or devices, operatively forming a part of the vehicular suspension system, which are intended to prevent the excessive downward movement of the front of the vehicle upon energization of the vehicular brake system. However, such anti-dive systems are, in the main, responsive to the sensed vehicular attitude which, in effect, means that the event, i.e., the downward movement of the front of the vehicle, has already started before any sort of signal or feed-back is applied to the anti-dive system control. Such prior art anti-dive systems, therefore, have no form of anticipatory input which would indicate to the anti-dive system control whether the force tending to create the downward movement of the front of the vehicle will be comparatively small or large which, in turn, is primarily dependent upon the rapidity and changing magnitude of force being applied by the vehicular operator to the vehicular braking system.

The invention as herein disclosed and described is primarily directed to the solution of the aforestated shortcoming as well as other related and attendant problems of the prior art.

SUMMARY OF THE INVENTION

According to one aspect, the invention comprises the combination of a vehicular braking system, vehicular accessory means and vehicular accessory control system, manually actuatable brake actuator means, said brake actuator means being effective upon manual application of an actuating force thereagainst for energization of said vehicular braking system, electrical sensor means, said electrical sensor means being effective to produce an electrical signal of variable values, wherein the value of said electrical signal is indicative of the magnitude of said actuating force then being applied to said brake actuator means, and electrical circuit means electrically connected to said electrical sensor means and operatively connected to said vehicular accessory control system, said electrical circuit means being effective to sense the rate of change of the magnitude of said actuating force being applied to said brake actuator means and produce an output signal related to said rate of change, and wherein said output signal is applied as an input signal to said vehicular accessory control system.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 13 is a top plan view of still another element shown in FIG. 4, as well as in FIG. 17;

FIG. 14 is a view taken generally on the plane of line 14—14 of FIG. 13 and looking in the direction of the arrows;

FIG. 15 is a top plan view of another element shown in FIG. 4, as well as in FIG. 17;

FIG. 16 is a view taken generally on the plane of line 16—16 of FIG. 15 and looking in the direction of the arrows;

FIG. 17 is a cross-sectional view taken generally on the plane of line 17—17 of FIG. 4 and looking in the directions of the arrows;

DETAILED DESCRIPTION OF THE PREFERRED EMBODIMENT

Figure 1:
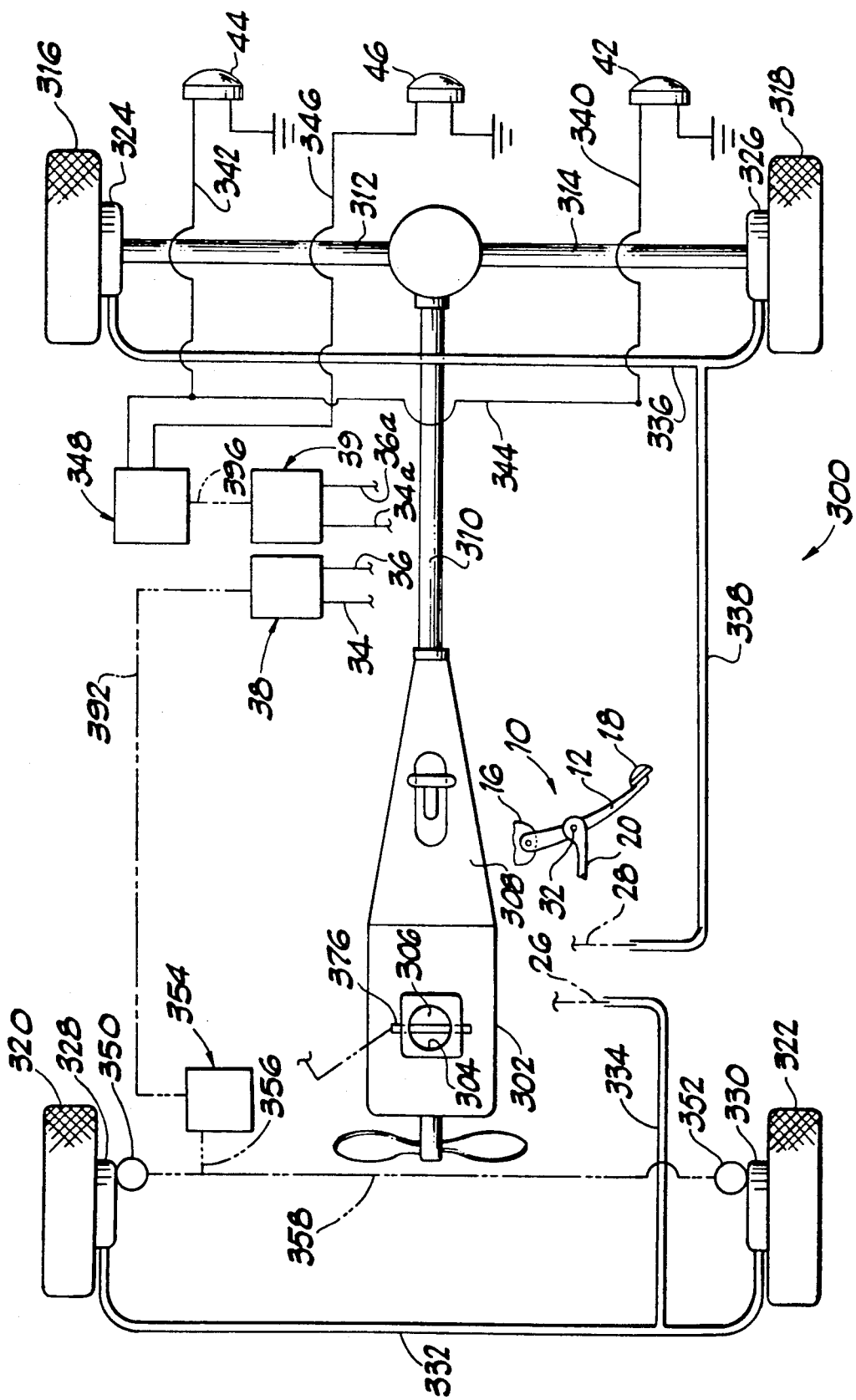
FIG. 1 is both a diagrammatic and schematic view of an automotive vehicle provided with certain diagrammatically depicted accessories and illustrating a portion of a brake lever assembly working in combination with other illustrated means in accordance with the teachings of the invention.

Referring now in greater detail to the drawings, FIG. 1 illustrates an automotive vehicle 300 having an engine 302 with an engine induction passage 304 variably controlled as by a selectively positionable and openable throttle valve 306. The engine 302 is operatively connected to associated transmission means 308, in this instance assumed to be an automatic transmission, which via drive shaft means 310 is effective to drive axle assemblies 312 and 314 respectively leading as to rearwardly situated vehicular ground engaging driving wheels 316 and 318. Forwardly situated ground engaging vehicular steering wheels are respectively depicted at 320 and 322.

Wheel assemblies 316, 318, 320 and 322 are respectively provided with wheel brake assemblies 324, 326, 328 and 330 each of which may be provided with anti-skid devices (not specifically shown but various forms of which are known in the art).

Figures 2, 3:
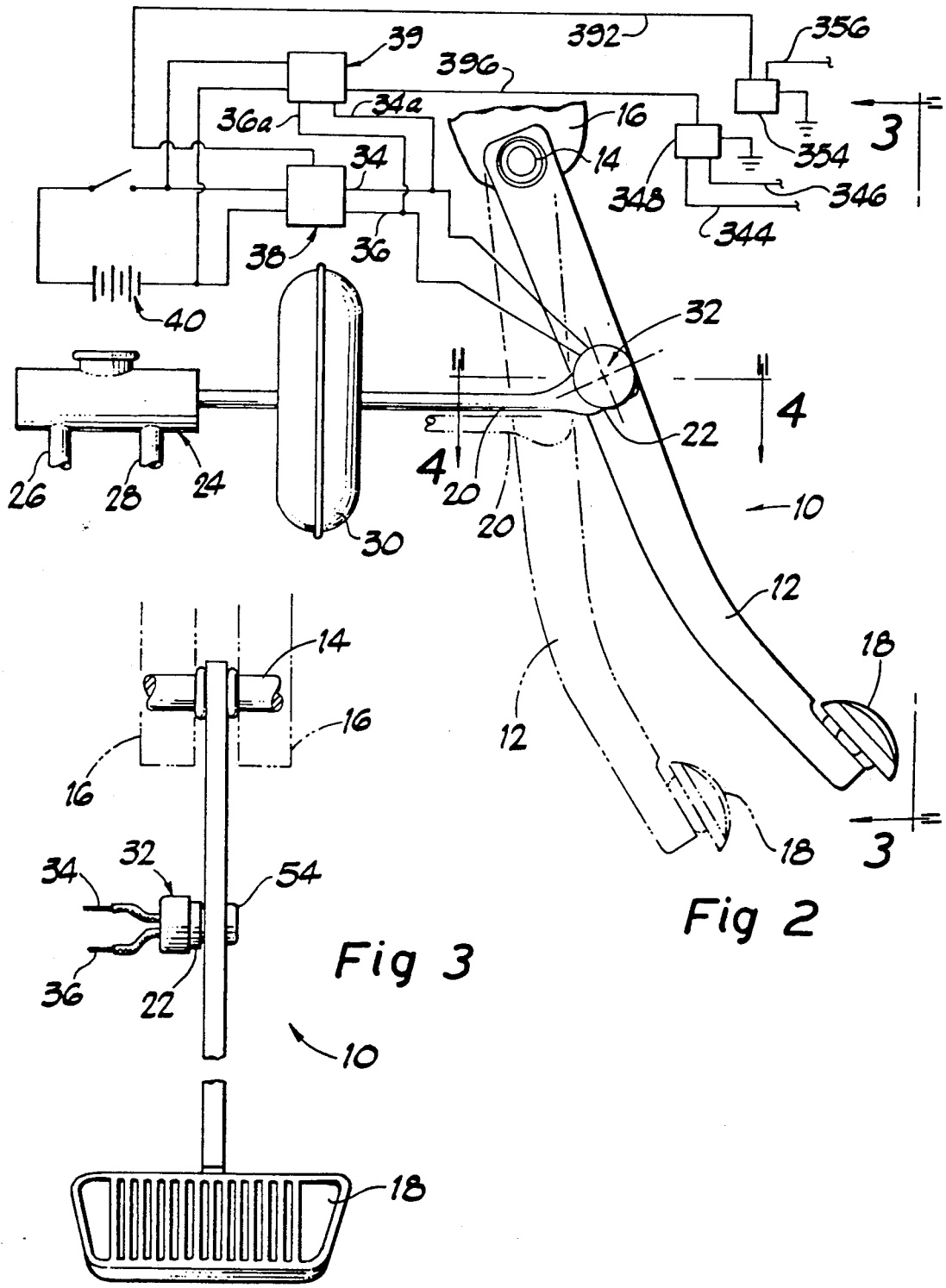
FIG. 2 is a side elevational, relatively enlarged, view of the automotive brake pedal assembly of FIG. 1 shown in combination with environmental structure and electrical circuitry some of which is generally diagrammatically illustrated while other portions are schematically illustrated.
FIG. 3 is a view taken generally on the plane of line 3—3 of FIG. 2 and looking in the direction of the arrows.

Conduit means 332 interconnecting wheel brake assemblies 328 and 330 is, in turn, in communication with conduit means 334 operatively connected as to supply conduit means 26 shown in FIG. 2. Similarly, conduit means 336 interconnecting wheel brake assemblies 324 and 326 is, in turn, in communication with conduit means 338 operatively connected as to supply conduit means 28 shown in FIG. 2. As is well known in the art conduit means 332, 334, 336 and 338 serve to convey brake assembly actuating hydraulic fluid; as is also well known, in the alternative, conduit means 332 may be arranged to instead communicate as between and with wheel brake assemblies 328 and 326 while conduit means 336 may be arranged to instead communicate as between and with wheel brake assemblies 324 and 330.

Rearward mounted stop lights or lamp assemblies 42, 44 and 46 are electrically connected, as via conductor means 340, 342, 344 and 346 to associated electrical switch means 39 solid state or otherwise.

The forward vehicular suspension means may be provided with suitable anti-dive means and such are depicted at 350 and 352 and, as is known in the art, serve to in effect limit the amount that the forward part of the vehicle moves downwardly during, as for example, when the vehicle, moving forwardly, is experiencing braking. Suitable control means 354 is operatively connected, as depicted by phantom lines 356 and 358, to the anti-dive means 350 and 352.

Circuit means, depicted as at 38, provides output signals to the depicted control means as generally illustrated by phantom lines 392 and 396.

Vehicular brake lever assembly means is partially illustrated at 10 with such, and associated structure and means, being illustrated in greater detail in the following drawing Figures.

FIGS. 2 and 3 illustrate a portion of an overall braking system of the associated automotive vehicle 300. The brake pedal means 10 is depicted as comprising a lever body 12 pivotally connected, at its upper end, as by pivot means 14 operatively connected to journal or pivot support means 16 which, in turn, may comprise a portion of the vehicular structure. The lower end of lever body 12 carries a brake pedal 18 suitably secured thereto.

A brake actuating rod or push rod 20 has its right end 22 (as viewed in FIG. 2) pivotally connected to brake lever 12. When the brake pedal assembly 10 is actuated by the vehicular driver, from its null or inactive state as depicted in solid line in FIG. 2 to its assumed maximum braking force as depicted in phantom line in FIG. 2, the push rod or brake rod 20 moves toward the left (as viewed in FIG. 2) as to cause a hydraulic displacement in an associated vehicular brake system master cylinder assembly 24 thereby applying a hydraulic pressure, as via conduit means 26 and 28 to the respective wheel brake assemblies 324, 326, 328 and 330 of the associated vehicle as through conduit means 334 and 336. Such application of a braking force may be done directly by the brake rod or arm 20 or through associated power assist means depicted at 30.

The operative connection as between the brake rod 20 and brake lever 12 comprises a signal mechanism 32 which is effective for creating electrical signals when selected magnitudes of force are applied to the brake pedal 18. When such electrical signals are applied via conductor means 34, 34a, 36 and 36a to related electrical circuit means 38 and 39, solid state or otherwise, the vehicular source of emf 40 energizes the various controls of FIG. 1.

Figure 4:
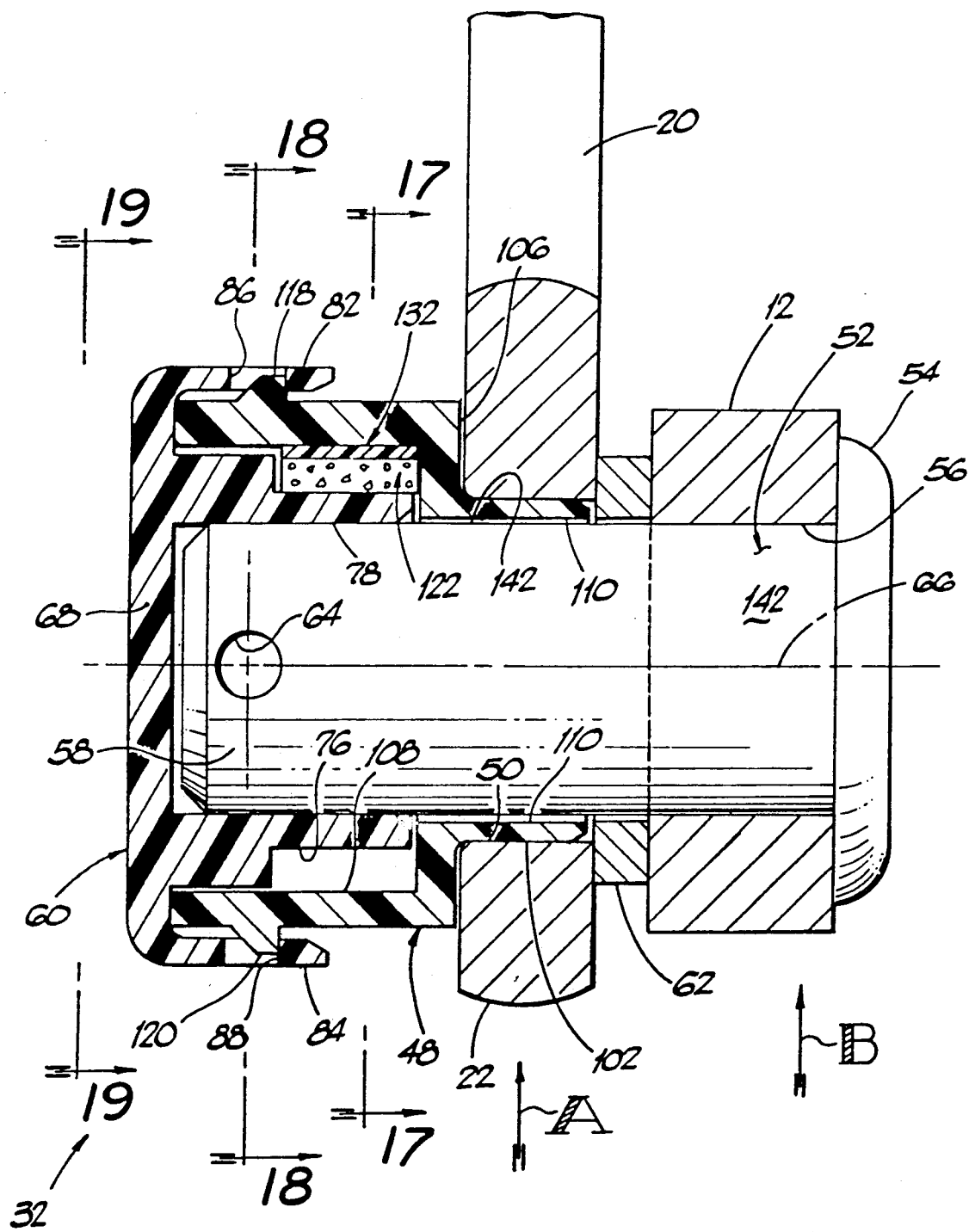
FIG. 4 is a cross-sectional view, in relatively enlarged scale, taken generally on the plane of line 4—4 of FIG. 2 and looking in the direction of the arrows.

Referring to FIG. 4, the signal mechanism or sensor assembly 32 is illustrated as comprising a first generally tubular member 48, of stepped cylindrical diameter, received within and by a cooperating passage or aperture 50 formed through the push rod or brake rod 20. A cylindrical pin or cross-member 52, having a head 54, received by a passage or aperture 56 in brake lever 12, extends through at least a portion of member 48 as to have its left-most end 58 (as viewed in FIG. 4) received by a counterbore of a generally outermost member 60. In the embodiment depicted, a passage 64 is formed through pin or cross-member 52 preferably as to have its longitudinal axis normal to the center-line or longitudinal axis 66 of pin 52. If desired, an annular spacer 62 may be provided as between brake lever 12 and brake rod 20.

Referring to FIGS. 5, 6, 7 and 8, the outermost member 60, which may be considered, for example, as a cover, bearing and/or carrier, is illustrated as comprising a circular or disk-like axial end wall 68 which is integrally formed with a first generally axially aligned tubular wall portion 70, having an outer cylindrical surface 72, and a second axially aligned tubular wall portion 74 having an outer cylindrical surface 76 of an outer diameter significantly less than that of surface 72. The wall portions 70 and 74 define an inner cylindrical surface 78 which is open at the right (as viewed in FIG. 7) or outermost end thereof as at 80.

Figure 6:
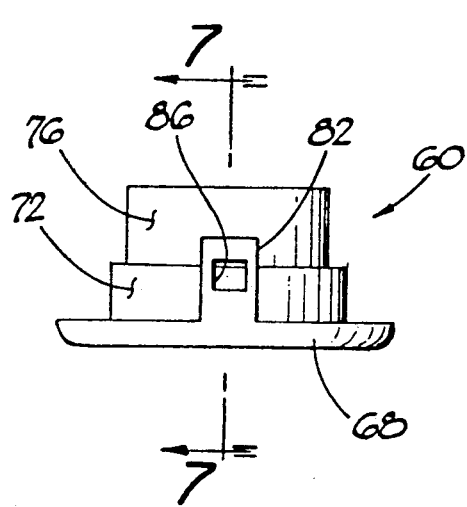
FIG. 6 is a view taken generally on the plane of line 6—6 of FIG. 5 and looking in the direction of the arrows.
Figure 7:
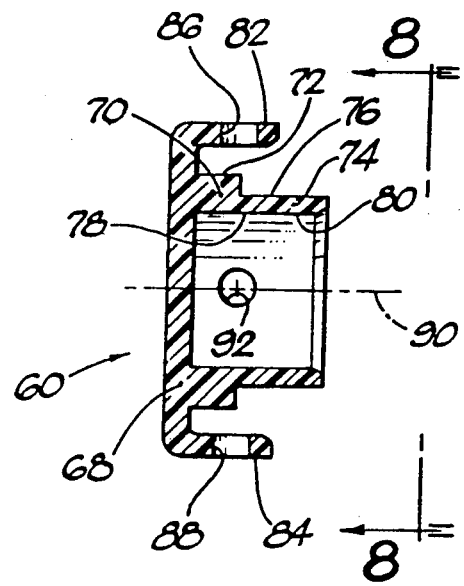
FIG. 7 is a cross-sectional view taken generally on the plane of line 7—7 of FIG. 6 and looking in the direction of the arrows.
Figure 5:
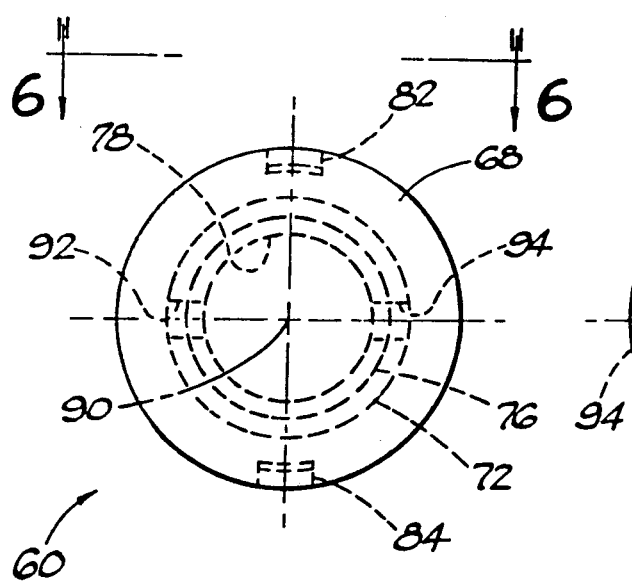
FIG. 5 is an axial end elevational view, in relatively reduced scale, of one of the elements shown in FIG. 4.
Figure 8:
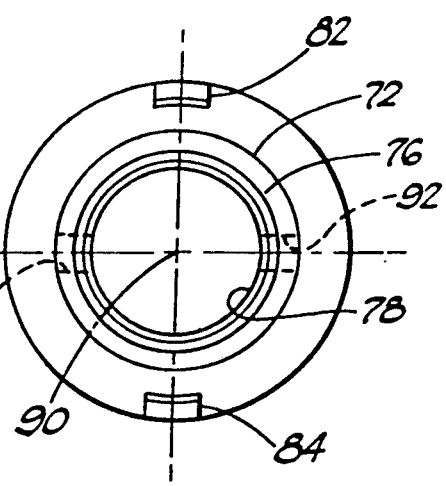
FIG. 8 is a view taken generally on the plane of line 8—8 of FIG. 7 and looking in the direction of the arrows.
Figure 12:
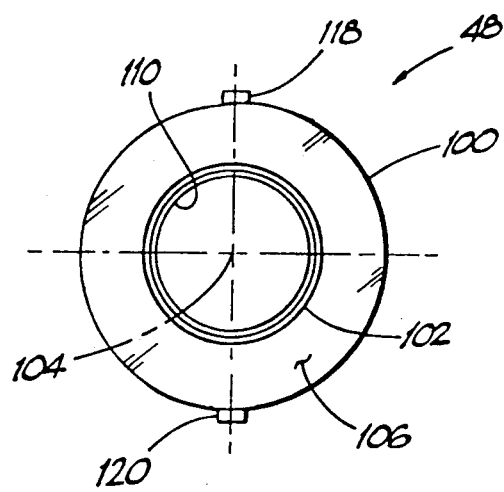
FIG. 12 is a view taken generally on the plane of line 12—12 of FIG. 9 and looking in the direction of the arrows.

In the preferred embodiment, the disk-like end portion 68 of carrier 60 is provided with integrally formed diametrically situated arms 82 and 84 which, in turn, have generally squared holes or passages 86 and 88 formed therethrough. As best seen in FIGS. 6 and 7, the arms 82 and 84 extend from end wall 68 generally parallel to the axis 90 of member 60. Also, as shown in each of FIGS. 5, 7 and 8, aligned passageways 92 and 94, preferably on diameter, are formed through the walls of the tubular portion of member 60. In the preferred embodiment, the and cover or carrier 60 is formed of suitable plastic material as, for example, a 30% glass reinforced polyester. Such could be, for example, "Rynite" which is a United States of America registered trademark, of DuPont de Nemours, E.I. & Co. of Wilmington, Del., for a glass-reinforced polyester; a modified polyethylene terephthalate featuring high temperature resistance, high tensile and impact strength and good electrical resistance.

FIGS. 9, 10, 11 and 12 illustrate the housing 48 (of FIG. 4) as comprising a first relatively large generally tubular cylindrical body portion 96 which is integrally formed with a second relatively small generally tubular cylindrical body portion 98. Body portions 96 and 98 are respectively provided with outer cylindrical surface 100 and 102 which are substantially concentric to each other and having an axis 104. A generally radially directed annular shoulder surface 106 effectively interconnects outer cylindrical surfaces 100 and 102.

Figure 11:
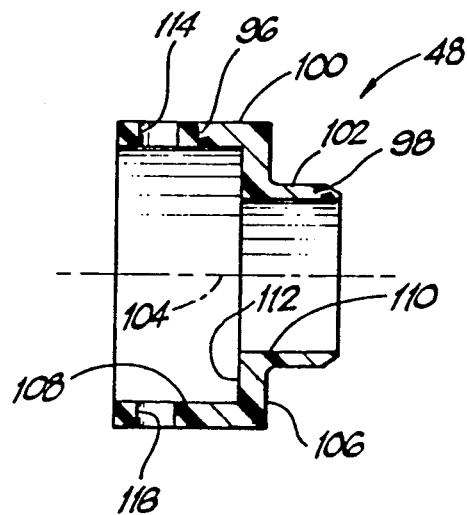
FIG. 11 is an axial cross-sectional view taken generally on the plane of line 11—11 of FIG. 9 and looking in the direction of the arrows.
Figure 10:
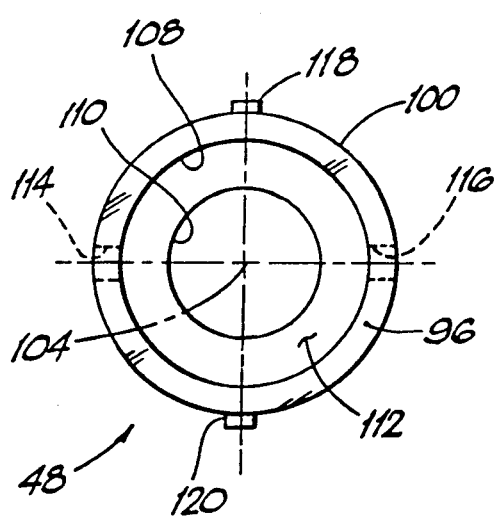
FIG. 10 is a view taken generally on the plane of line 10—10 of FIG. 9 and looking in the direction of the arrows.
Figure 9:
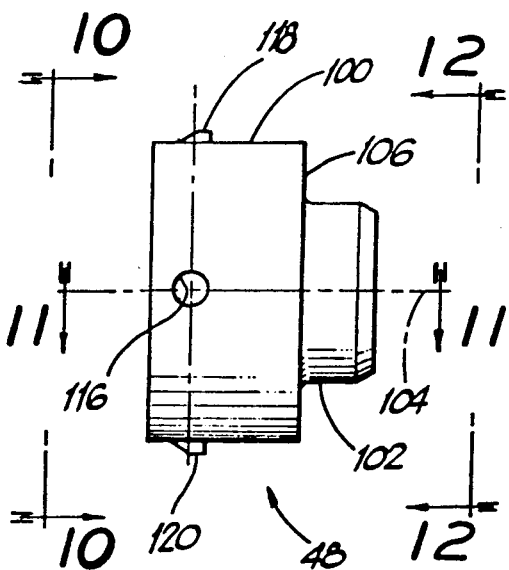
FIG. 9 is a side elevational view, in relatively reduced scale, of another element shown in FIG. 4.

Somewhat similarly, body portions 96 and 98 are respectively provided with inner cylindrical surfaces 108 and 110 which are substantially concentric to each other and also have the same axis 104. The cylindrical surface 110 is a through passage while cylindrical surface 108 ends as at an internal radially directed annular surface 112. As shown in each of FIGS. 9, 10 and 11, aligned passageways 114 and 116, preferably on diameter, are formed through the walls of the cylindrical body portion 96. As seen in FIGS. 9, 10 and 11, a plurality of diametrically opposed ear-like locking or detent portions 118 and 120 are preferably integrally formed with cylindrical body portion 96 as to extend radially outwardly of outer cylindrical surface 100.

In the preferred embodiment the housing or force transfer member 48 is formed of a suitable plastic material which, for example, may be the same material comprising member 60 as already herein described.

FIGS. 13 and 14 illustrate another element shown in FIG. 4 (as well as in FIG. 17). More specifically a backing member or force distribution member 122 is depicted in FIGS. 13 and 14 as being of a generally parallelepiped configuration having relatively wide opposite surfaces 124 and 126 and relatively narrow opposite side or edge surfaces 128 and 130. In the preferred embodiment, member 122 is comprised of rubber or any other suitable elastomeric material.

FIGS. 15 and 16 illustrate a force sensor cell 132 which, in the embodiment disclosed comprises a force sensing resistor. Generally, such a force sensing resistor 132 may comprise two sheets of polymer film with one of such sheets having a set of conductive interdigitating fingers terminating in two electrical terminals or leads 134 and 136. On the other sheet, an electrically resistive film is applied to one side thereof. The two sheets are then brought together as to have the resistive film lie across and against the conductive finger network of the first mentioned sheet thereby forming what may be considered a sandwich-like construction. Applying a force to the resulting sandwich construction causes the electrical resistance as between the contacts or terminals 134 and 136 to decrease. In FIG. 15, the generally darkened area 138 is intended to designate the area wherein the conductive finger network and cooperating resistive film may be located. In the preferred embodiment, the lower surface 140 of the lower (as in FIG. 16) sheet would be provided with a suitable adhesive. Such a force sensing resistor may be obtained, as for example, from Interlink Electronics, Inc. having an address of 535 E. Montecito Street, Santa Barbara, Calif.

Referring to FIGS. 4, 11 and 17, the housing or brake force transmitting member 48 is shown having its smaller tubular body portion 98 received within the aperture or passage 50, formed through the brake rod 20, in a manner whereby the outer cylindrical surface 102 is preferably press-fitted into and against the cooperating cylindrical surface of aperture 50. At this time the radially extending annular surface 106 may be juxtaposed to or in contact with the brake actuating rod 20. The brake lever or arm pin 52 is closely received through the cooperating aperture 56 in brake lever 12 in a manner whereby the head 54, thereof, effectively abuts against brake lever 12 while the cylindrical shank portion 142 thereof slides through an annular spacer 62, if such be desired, and loosely slides through the cylindrical passage 110 of member 48. At this point, as possibly best seen in FIG. 4, it should be mentioned that at least in the area where the outer cylindrical surface of cylindrical shank portion 142 is in juxtaposition to passage 110 of member 48, the inner diameter of cylindrical passage 110 is a selected amount larger than the outer diameter of cylindrical shank portion 142. By way of example, and not limitation the difference between the outer diameter of shank portion 142 and the inner diameter of passage 110 may be in the order of 0.016 inch (0.41 mm.). For purposes of clarity and ease of description, FIGS. 4 and 17 may be considered as representing two different states or conditions of the braking system. That is, in FIG. 4, wherein arrow A indicates the direction of travel by the brake rod means 20, during energization of the vehicular brakes, and wherein arrow B indicates the general direction of travel by the brake lever 12 during energization of the vehicular brakes, the assembly of FIG. 4 depicts what may be considered some intermediate condition of vehicular brake application by the vehicular driver during which the outer cylindrical surface of shank 142 is not in contact with inner cylindrical surface 110 as appears either above or below the axis 66. FIG. 17, in comparison, illustrates the same elements, as shown in FIG. 4, in what may be considered as a null or inactivated state of vehicular brake energization with, at that time, the outer cylindrical surface of shank 142 resting against the inner cylindrical surface 110, as at a point 143 situated as on the horizontally depicted axis 144, as at where it is crossed by the vertical axis 147, thereby describing a crescent-like space between the shank 142 and surface 110 as depicted generally left of the vertical axis 146 in FIG. 17. In the condition depicted in FIG. 17, the axis 66 of shank 142 would be displaced generally to the right of axis 104 of member 48 (as viewed in FIG. 17).

In the preferred arrangement, force sensitive resistor means or cell 132 is suitably secured as by, for example, an adhesive to the inner cylindrical surface 108 of housing or brake force transmitting member 48 as to be located and positioned as generally depicted in FIGS. 4 and 17. The elastomeric or backing member 122 may then be applied, adhesively, onto the force sensitive resistor means or cell 132 as to be located and positioned as also generally depicted in FIGS. 4 and 17. A suitable clearance aperture or passage 148 may be formed through the wall 96 of member 48 and the conductors 34 and 36 (also see FIG. 2) drawn therethrough as to have the ends thereof respectively electrically connected to contacts or terminals 134 and 136 of force responsive cell 132.

Cover or bearing member 60, being aligned or positioned as best shown in FIG. 4, slides axially into inner cylindrical surface 108 of member 48. The arms 82 and 84 of member 60 first override the cooperating tab-like portions 118 and 120 and finally abutably engage such portions 118 and 120 by respective reception thereof in arm apertures 86 and 88. Thus assembled, with elastomeric member 122 abutting outer cylindrical surface 76 of member 60, and cell member 132 abutting inner cylindrical surface 108 of member 48, and conductors 34 and 36 electrically connected to contacts 134 and 136, the entire assembly unit is slid onto the pin shank 142, with inner cylindrical surface 110 of member 48 being of a clearance condition over pin shank 142. The engagement as between inner cylindrical surface 78 of member 60 and the outer cylindrical surface of shank portion 142 is preferably a light press-fit. As the thusly preassembled unit continues to be moved axially onto shank 142, outer cylindrical surface 102 of member 48 engages with aperture or passage 50, formed through push rod or member 20 with the engagement of cylindrical surface 102 and passage 50 also preferably being a light press-fit.

Figure 18:
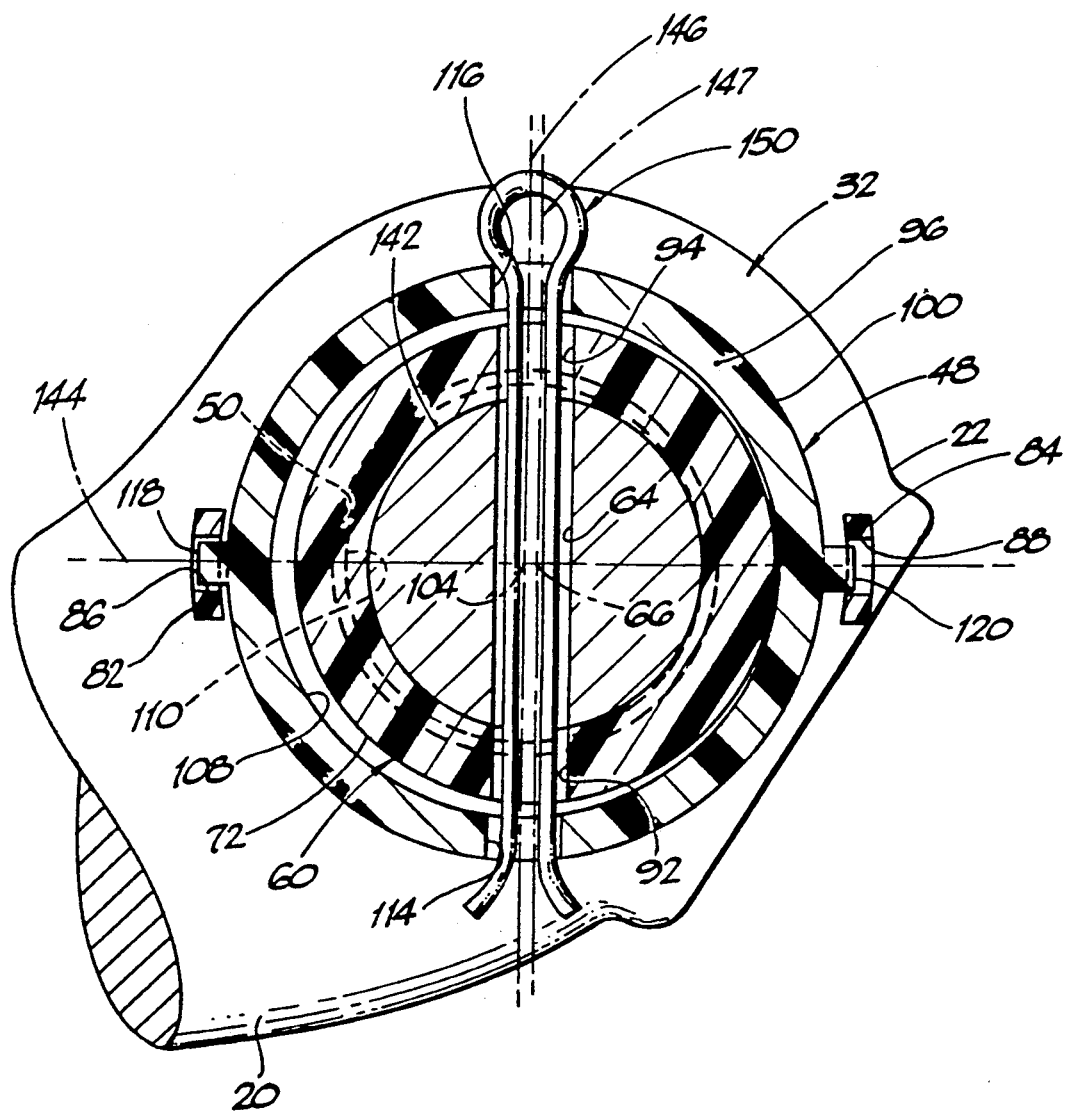
FIG. 18 is a cross-sectional view taken generally on the plane of line 18—18 of FIG. 4 and looking in the direction of the arrows.
Figure 19:
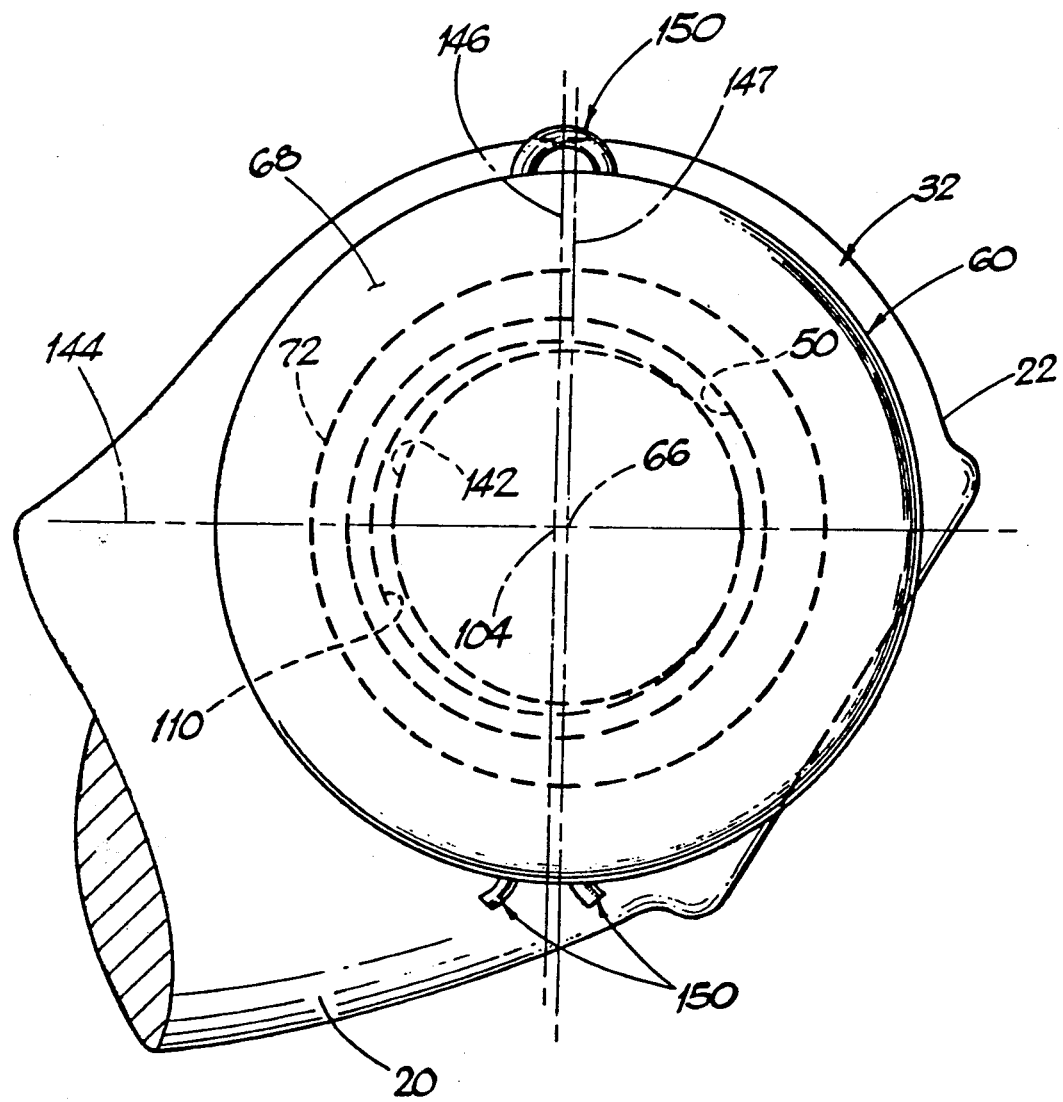
FIG. 19 is an axial end view taken generally on the plane of line 19—19 of FIG. 4 and looking in the direction of the arrows.

In FIG. 18, the various elements shown therein are illustrated in a brake system null operating condition or position corresponding to that of FIG. 17. The direction of movement of the brake rod 20, during energization of the vehicular brake system would be generally to the left (as viewed in FIG. 18) as along, for example, axis 144. Once the various elements are assembled, as described with reference to FIG. 17, passageway 64 in pin shank 142 is in alignment with passages or apertures 92 and 94 of member 60 and, generally, in alignment with passages or apertures 114 and 116 of member 48. However, during the depicted unactivated state of brake application, the centers 104 and 66 are slightly spaced from each other thereby resulting in apertures 114 and 116 likewise being somewhat eccentrically situated with respect to passageway 64 and apertures 92 and 94. Preferably, suitable locking means such as, for example, a cotter pin or key 150 is inserted into such aligned apertures and passage to thereby prevent accidental disengagement as between and among members 48 and 60 and pin 52.

OPERATION OF THE STRUCTURES OF FIGS. 2-19

As should now be apparent, when the vehicular brake lever 12 is in its inactive state the lever 12 will be in its solid-line position as depicted in FIG. 2 and the various elements comprising the sensor assembly 32 will be in positions as generally depicted in and described with reference to FIG. 17. Also, as should now be apparent, because of the differences in diametrical sizes of: (a) inner cylindrical passage 110 and cylindrical shank 142; (b) cylindrical surfaces 76 and 108; (c) cylindrical surface 72 and the radially inward surfaces of arms 82 and 84; and (d) cylindrical surfaces 72 and 78, the various elements are able to experience relative movement transversely of axis 104 and/or 66. However, because of the somewhat resilient preload caused by the elastomeric means 122, member 60 and pin or journal 52 are, during a de-energized mode of the brake lever 12, effectively held in their right-most position as depicted in and described with reference to FIG. 17. It is only during application or energization of the vehicular braking system that the member 60 and pin 52 move transversely and toward the left, as viewed in FIG. 17, relatively away from the contact point 143 and toward a contact as between pin 142 and surface 110, at the diametrically opposite area.

More specifically, let it be assumed that the associated vehicle is in motion and that the driver desires to bring the vehicle to a stop. The sequence of events, generally, would be as follow.

The driver would step against the brake lever pad 18 causing the brake lever 12 to start to pivotally rotate as toward the depicted phantom line position of FIG. 2. Such movement, of course, also initiates movement of the brake rod 20 toward the left (as viewed in FIG. 2) and as the brake rod 20 starts to so move, a resistance to further movement of rod 20 comes into existance. The resistance, generally, is the reactive force of the remaining portion of the vehicular braking system and, generally, the magnitude of such reactive force is related to the force being applied by the driver against the brake pedal pad 18.

Consequently, once braking force is being applied to the brake lever pad 18 causing clockwise rotation of the brake lever 12 while a reactive resistive force (in a generally opposite direction) is being applied by the brake rod 20 tending to prevent further clockwise rotation of brake lever 12. Referring to each of FIGS. 2, 4 and 17, it can be seen that as the brake lever 12 is further or more forcefully depressed (as in the direction of arrow B of FIG. 4) the reactive resistive force of brake rod 20 is actually experienced in a direction opposite to arrow A of FIG. 4. This then causes the previously discussed relative transverse movement whereby pin 52 and number 60 move (generally in the directions of arrows A and B of FIG. 4) close to having pin shank 142 becoming engaged against cylindrical surface 110 (as in the area above axis 66 of FIG. 4). Such relative transverse movement causes the force sensitive resistance means 132 to experience an increasing magnitude of force thereagainst resulting, in the embodiment disclosed, in the related decrease of resistance across terminals or contacts 134 and 136. As the resistance is thusly progressively diminished in value, the resulting voltage across conductors 34 and 36, and parallel circuit branches 34a and 36a, becomes sufficient to trigger suitable related logic type circuit means 39 which, in turn, enables the vehicular source of emf 40 to energize the vehicular stop lights or lamps 42, 44 and 46. Also, as will be described, control means as generally depicted in FIG. 1, are acted upon in response to the rate of change of the magnitude of electrical resistance in means 132.

Generally, when the driver subsequently releases the brake lever 12, the brake actuating force, is of course, eliminated thereby immediately eliminating the prior existing compressive force experienced by the force sensitive resistance means 132 and, simultaneously enabling the elastomeric means 122 to again position the components as generally depicted in FIGS. 17 and 18. Such elimination of the brake actuating force and the concomittant elimination of the corresponding related magnitudes of compressive force experienced by the force sensitive resistance means 132 returns the force sensitive resistance means 132 to a relative high state of resistance and the resulting loss of voltage as across conductor means 34 and 36, and parallel circuit branches 34a and 36a, becomes insufficient to cause the logic circuit means 39 to continue energization of the associated stop lamps 42, 44 and 46.

As should now be apparent, the structure of FIGS. 2-19 provides a means and system for appropriately energizing associated electrical circuit means 39 without the necessity of employing any mechanical type electrical switch means, often subject to failure, and without the necessity of employing any hydraulic pressure responsive switch means which, too, are often subject to failure. Further, unlike the prior art, the structure of FIGS. 2-19 does not depend upon the employment of movable electrical contacts which are susceptible to corrosion and/or electrical pitting as well as mechanical failure. Also, for all practical purposes the structure of FIGS. 2-19 provides an assembly which is, by design, inherently resistive to the intrusion of dirt and or moisture and the degree to which such may intrude into the overall assembly, the operation thereof is not significantly impaired.

Figure 20:
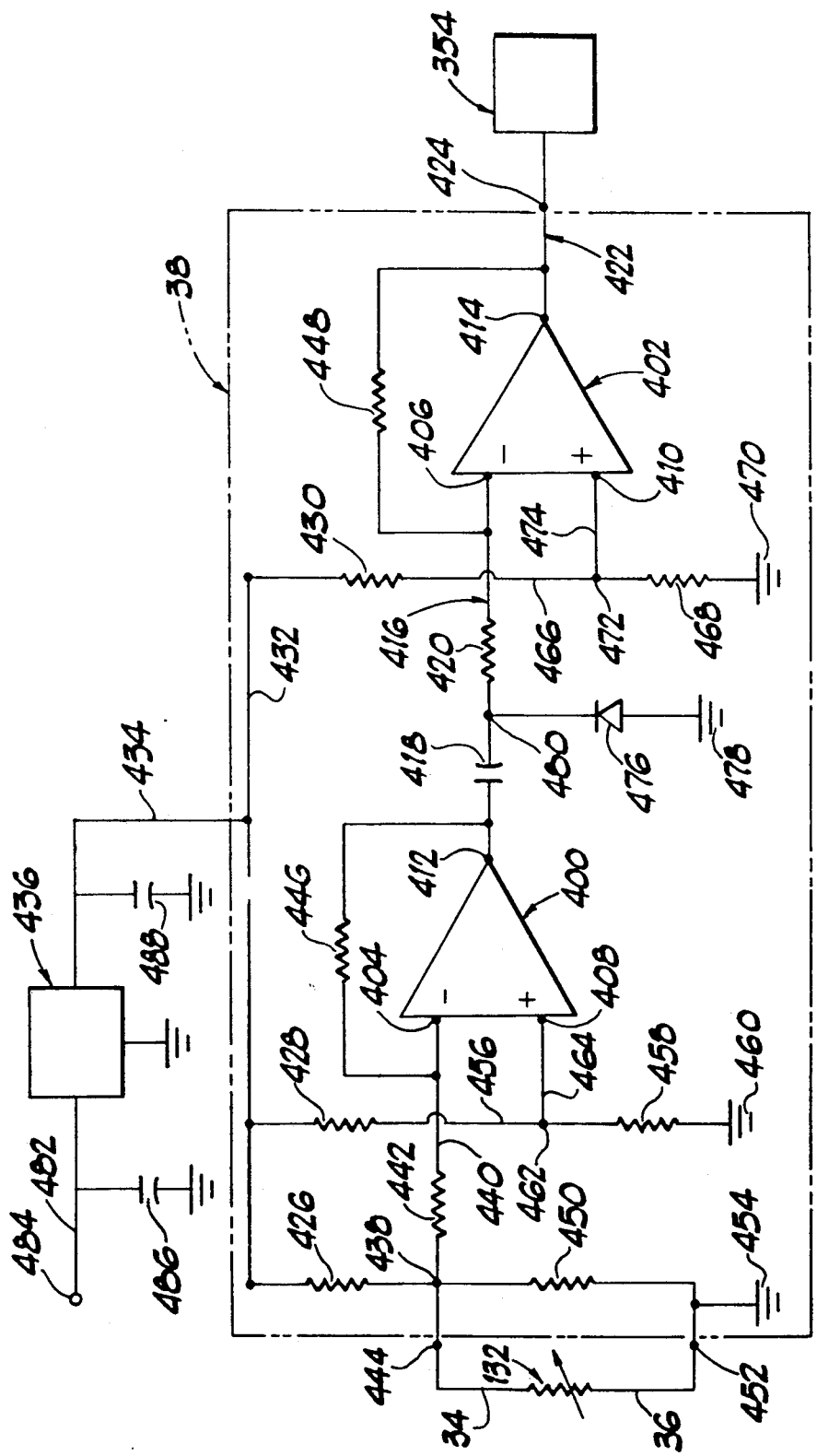
FIG. 20 is a schematic wiring diagram of electrical circuit means diagrammatically depicted in FIG. 1.

FIG. 20, schematically, depicts the circuit means 38 (also see FIGS. 1 and 2) as comprising operational amplifiers 400 and 402 respectively having negative (−) input terminal means 404 and 406, positive (+) input terminal means 408 and 410 along with output terminals 412 and 414.

Conductor means 416, comprising capacitor means 418 and resistance means 420, electrically interconnects the output terminal means 412 of amplifier means 400 to the negative input terminal means 406 of amplifier means 402. The output terminal means 414 of amplifier 402 is electrically connected via conductor means 422, which may comprise terminal means 424, to the input of control means 354 (also see FIGS. 1 and 2).

Respective first ends of resistors 426, 428 and 430 are electrically interconnected as by conductor means 432 which, in turn, is electrically connected as via conductor means 434 to suitable voltage regulator means 436. The other end of resistance means 426 is electrically connected, as at a point 438, to conductor means 440 which, in turn, is electrically connected to input terminal means 404, comprised of resistance means 442 and preferably provided with terminal means 444.

A feedback resistance means 446 is electrically connected as to have its opposite electrical ends connected to input terminal means 404 (as via conductor means 440) and output terminal means 412 (as via conductor means 416). A second feedback resistance means 448 is electrically connected as to have its opposite electrical ends connected to input terminal means 406 (as via conductor means 416) and output terminal means 414 (as via conductor means 422).

A resistance means 450 has its first electrical end connected to conductor means 440, as at point 438, and its other electrical end connected as to terminal means 452 and electrical ground 454.

The other electrical end of resistance means 428 is electrically connected, as via conductor means 456, to resistance means 458 which, in turn, is connected to electrical ground 460. Input terminal 408 is connected to a point 462 electrically between resistors 428 and 458 as by conductor means 464.

The other electrical end of resistance means 430 is electrically connected, as via conductor means 466, to resistance means 468 which, in turn, is connected to electrical ground 470. Input terminal 410 is connected to a point 472 electrically between resistors 430 and 468 as by conductor means 474.

A diode 476 is electrically connected to ground 478 and to conductor means 416, as at a point 480, electrically between capacitor means 418 and resistance means 420.

The voltage regulator means 436 may be considered as comprising conductor means 482 having an input, as a terminal 484, electrically connected to a vehicular supply voltage, which may be the depicted source of emf. 40 in FIG. 2. A first capacitor means 486 is electrically between ground and input conductor means 482, while a second capacitor means 488 is electrically between ground and output conductor means 434.

The force sensitive resistance means 132 is shown with its leads 34 and 36 respectively connected as to terminal means 444 and 452. As should be apparent the variable force sensitive resistance means 132 and resistance 450 are in parallel with each other the ultimate result of which is to produce an operational input signal, resulting from the action of the force sensitive resistance means 132, which is of a linearity characteristic improved over that which would be obtained if the parallel resistor 450 were not employed. Further, the inclusion of the parallel resistor 450 provides for voltage limitation to such parallel network.

OPERATION OF THE EMBODIMENT OF FIG. 20

Referring in greater detail to FIG. 20, the operational amplifier 400 is configured as an inverting DC amplifier. That is, the magnitude of the positive (+) input at terminal 408 is held at a fixed voltage while the signal of varying magnitude is applied to the negative (−) input terminal at 404. As a consequence the amplifier 400 becomes an inverting amplifier in that the output, as at 412, goes in the opposite direction of the input at 404.

As should now be apparent, resistance means 428 and 458 comprise a first voltage divider serving to maintain a voltage of fixed value applied to the (+) input terminal 408 of amplifier 400. Resistance means 430 and 468 comprise a second voltage divider serving to maintain a voltage of fixed value applied to the (+) input terminal 410 of amplifier 402.

When the vehicular brake system is not energized and the brake lever 12 is in its inactive state the lever 12 will be in its solid-line position as depicted in FIG. 2 and the various elements comprising the sensor assembly 32 will be in positions as generally depicted in and described with reference to FIG. 17. In this condition the magnitude of the resistance of the force sensitive resistance means will be at its greatest value and the voltage at point 438 will also be at its greatest magnitude. This magnitude of voltage at point 438 may be considered its quiescent value. Since the output of amplifier 400, at 412, is inverted, the magnitude of the output voltage at 412, at this time, will be at its lowest magnitude and may be considered its quiescent value.

Similarly, capacitor 418 and amplifier 402 will also be at their respective quiescent values.

As the vehicle operator applies a braking force to the brake pedal 12, to bring about a braking action to the vehicular wheels, the operator applied-force is applied to the vehicular braking system through the force sensitive resistance means 132. As already described, the greater the force thusly applied to and through the force sensitive resistance means (FSR) 132 the more the resistance value of the FSR 132 decreases. As the resistance of FSR decreases the magnitude of the voltage at point 438 also decreases and the decrease in such voltage is sensed as an input at terminal 404 of amplifier 400. Since amplifier 400 is configured as an inverting amplifier, such a decrease in the magnitude of voltage, sensed at (−) input 404, results in an increase in the magnitude of the output voltage of amplifier 400 as at 412.

Operational amplifier 402 and its associated components, as for example, capacitor means 418, function as a differentiating circuit. Because of the increasing (or rising) value of the output voltage at 412 current starts to flow into capacitor means 418 and such current then flows through resistance means 420 and 448 resulting in the decrease of the magnitude of the voltage at 414. The current from capacitor 418 flowing through resistor 420 cannot flow into the (−) input terminal 406 because of its high resistance and therefore is forced to flow through the feedback resistor 448. Also, current thusly flowing through resistors 420 and 448 cannot flow into or through diode means 476.

The effect of this action is that the reduction of the voltage at 414 is proportional to the rate of change in the decrease in resistance of FSR 132 which, of course, is directly related to the rate of change of the braking force applied, by the vehicle operator, to the brake pedal 12. The voltage at 414, and therefore along conductor means 422, is applied as an input or control signal to the control means 354.

As is generally known in the art, at least one form of vehicular anti-dive suspension system, sometimes called active suspension system, employs suspension shock absorbers at the forward portion of the suspension system wherein such shock absorbers employ the flow of a fluid medium to damp the upward movement (relative to the vehicular body) of the front vehicular wheels. In such arrangements variable orifice means are employed within the shock absorbers whereby the flow of shock absorber fluid is accordingly restricted depending upon the then flow area of the variable orifice means. The control means 354, in effect, determines the appropriate flow area of such variable orifice means based on selected sensed vehicular operating parameters. By providing a signal to the control means 354 which signal is indicative of the rate of change of braking force being applied, the control means 354 is then able to more accurately and quickly respond to the then changing conditions and, therefore, more accurately and quickly change the effective flow area of the variable orifice means to better compensate as for panic type braking of the vehicle.

When the braking force on the brake pedal 12 is released by the vehicle operator, the resistance of the FSR 132 increases to its original or quiescent value and the voltage as at point 438 therefore increases to its quiescent magnitude while the magnitude of the voltage at output 412 decreases to its quiescent value. The excess of charge, at this time, in capacitor 418 is removed by charging capacitor 418 in the opposite direction through diode means 476 thereby leaving the output of amplifier 402 at its quiescent value which is the voltage at point 472 of the voltage divider comprised of resistors 430 and 468.

The invention has been disclosed and described in an environment comprising vehicular accessory means as anti-dive or active suspension means. It should be apparent that the practice of the invention is not limited to such accessory means and may be practiced as in combination with other compatible accessories and/or controls.

Although only a preferred embodiment of the invention has been disclosed and described, it is apparent that other embodiments and modifications of the invention are possible within the scope of the appended claims.

What is claimed is:

1. The combination of a vehicular braking system, vehicular accessory means and vehicular accessory control means, comprising manually actuatable brake actuator means, said brake actuator means being effective upon manual application of an actuating force thereagainst for energization of said vehicular braking system, electrical sensor means, said electrical sensor means being effective to produce an electrical signal of variable values, wherein the value of said electrical signal is indicative of the magnitude of said actuating force then being applied to said brake actuator means, and electrical circuit means electrically connected to said electrical sensor means and operatively connected to said vehicular accessory control means, said electrical circuit means being effective to sense the rate of change of the magnitude of said actuating force being applied to said brake actuator means and produce an output signal related to said rate of change, and wherein said output signal is applied as an input signal to said vehicular accessory control means.

2. The combination according to claim 1 wherein said electrical sensor means comprises force sensitive electrical resistance means.

3. The combination according to claim 1 wherein said electrical sensor means comprises force sensitive electrical resistance means, and wherein the magnitude of the electrical resistance of said force sensitive electrical resistance means decreases as the force applied to said force sensitive electrical resistance means increases.

4. The combination according to claim 1 wherein said vehicular accessory means comprises vehicular anti-dive suspension means, and wherein said vehicular accessory control means comprises control means for said anti-dive suspension means.

5. The combination according to claim 1 wherein said electrical circuit means comprises first and second amplifier means, wherein said first amplifier means comprises first input means and first output means, wherein said second amplifier means comprises second input means and second output means, and further comprising first feedback resistor means electrically connected to said first input means and to said first output means, second feedback resistor means electrically connected to said second input means and to said second output means, wherein said electrical sensor means is electrically connected to said first input means of said first amplifier means, wherein said second output means of said second amplifier means is electrically connected to said vehicular accessory control means, and wherein said first output means of said first amplifier means is electrically connected to said second input means of said second amplifier means.

6. The combination according to claim 5 wherein said electrical sensor means comprises force sensitive electrical resistance means.

7. The combination according to claim 5 and further comprising capacitor means, and wherein said first output means of said first amplifier means is electrically connected to said second input means of said second amplifier means by being electrically coupled through said capacitor means.

8. The combination according to claim 7 wherein said electrical sensor means comprises force sensitive electrical resistance means.

9. The combination according to claim 5 and further comprising additional electrical resistance means and capacitor means, and wherein said first output means of said first amplifier means is electrically connected to said second input means of said second amplifier means by being electrically coupled through said capacitor means and said additional resistance means wherein said capacitor means and said additional resistance means are in series circuit with each other and with said first output means of said first amplifier means and with said second input means of said second amplifier means.

10. The combination according to claim 9 wherein said electrical sensor means comprises force sensitive electrical resistance means.

11. The combination according to claim 5 and further comprising voltage divider means, said voltage divider means comprising first and second electrical resistors, wherein said first input means of said first amplifier means is electrically connected to said voltage divider means as to be electrically between said first and second electrical resistors, and wherein said electrical sensor means is electrically in parallel with one of said first and second electrical resistors.

12. The combination according to claim 11 wherein said electrical sensor means comprises force sensitive electrical resistance means.

13. The combination according to claim 5 and further comprising additional electrical resistance means and capacitor means, wherein said first output means of said first amplifier means is electrically connected to said second input means of said second amplifier means by being electrically coupled through said capacitor means and said additional resistance means wherein said capacitor means and said additional resistance means are in series circuit with each other and with said first output means of said first amplifier means and with said second input means of said second amplifier means, and further comprising voltage divider means, said voltage divider means comprising first and second electrical resistors, wherein said first input means of said first amplifier means is electrically connected to said voltage divider means as to be electrically between said first and second electrical resistors, and wherein said electrical sensor means is electrically in parallel with one of said first and second electrical resistors.

14. The combination according to claim 13 wherein said electrical sensor means comprises force sensitive electrical resistance means.

15. In a vehicle braking system having a master cylinder means, and a force responsive signal generating arrangement, comprising pedal means pivotally mounted in said vehicle for manually initiating the braking system, a force transmitting pin-like member carried by said pedal means for movement in unison therewith, push rod means for translating the arcuate motion of said pedal means into linear motion for actuation of said master cylinder means, force transmitting means carried by said push rod means for movement in unison therewith, wherein said force transmitting pin-like member is at least partly received in said force transmitting means, wherein a space exists as between juxtaposed surfaces of said force transmitting pin-like member and said force transmitting means, electrical circuit means, force sensitive electrical resistance means and elastomeric means collectively urging said juxtaposed surfaces toward abutting engagement with each other during such times as when said pedal means is not being manually actuated, wherein said force sensitive electrical resistance means is adapted for operative connection to a source of electrical potential and to said electrical circuit means, wherein when said pedal means is manually actuated all of the force manually applied to said pedal means is transmitted from said force transmitting pin-like member through said elastomeric means to said force transmitting means and to said push rod means for actuation of said master cylinder means, wherein said force sensitive electrical resistance means is effective to produce an electrical signal of variable values, wherein the value of said electrical signal is indicative of the magnitude of the force then being manually applied to said pedal means, wherein said signal of variable values is applied as an input to said electrical circuit means, and wherein said electrical circuit means is effective to produce an output signal related to the rate of change in the value of said signal of variable values.

* * * * *

UNITED STATES PATENT AND TRADEMARK OFFICE
CERTIFICATE OF CORRECTION

PATENT NO. : 5,137,338
DATED : August 11, 1992
INVENTOR(S) : Ronald D. Ingraham

It is certified that error appears in the above-identified patent and that said Letters Patent is hereby corrected as shown below:

Column 4, line 62, change "and" to --- end ---.

Column 14, line 26, between "means" and "said force" delete "to" and substitute therefor --- and through ---.

Column 14, line 26, after "said force" insert --sensitive electrical resistance mwans to said force--.

Signed and Sealed this

Sixteenth Day of November, 1993

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,137,338
DATED : August 11, 1992
INVENTOR(S) : Ronald D. Ingraham

It is certified that error appears in the above-indentified patent and that said Letters Patent is hereby corrected as shown below:

Column 4, line 62, change "and" to --end --.

Column 14, line 26, between "means" and "said force" delete "to" and substitute therefor -- and through --.

Column 14, line 26, after "said force" insert --sensitive electrical resistance means to said force --.

This certificate supercedes Certificate of Correction issued Nov. 13, 1993.

Signed and Sealed this

Seventeenth Day of May, 1994

Attest:

BRUCE LEHMAN

*Attesting Officer*  *Commissioner of Patents and Trademarks*